United States Patent [19]

Berberat et al.

[11] Patent Number: 5,248,512
[45] Date of Patent: Sep. 28, 1993

[54] PROCESS FOR PREPARING A MULTI-COMPONENT FOOD PRODUCT INCLUDING A PROTECTIVE BARRIER

[75] Inventors: Alexis Berberat, Corseaux; Ulrich Wissgott, La Tour-de-Peilz, both of Switzerland

[73] Assignee: Nestec S.A., Vevey, Switzerland

[21] Appl. No.: 403,602

[22] Filed: Sep. 5, 1989

[30] Foreign Application Priority Data

Apr. 21, 1989 [EP] European Pat. Off. ......... 89107175.5

[51] Int. Cl.$^5$ .............................................. A23P 1/08
[52] U.S. Cl. ................................. 426/302; 426/275; 426/293
[58] Field of Search ............ 426/89, 92, 93, 94, 426/103, 302, 305, 307, 578, 274, 275, 293

[56] References Cited

U.S. PATENT DOCUMENTS

| | | | |
|---|---|---|---|
| 3,427,951 | 2/1969 | Mitan et al. | 426/302 |
| 3,667,963 | 6/1972 | Katter et al. | 426/95 |
| 3,794,742 | 2/1974 | Harris et al. | 426/305 |
| 4,031,261 | 6/1977 | Durst | 426/143 |
| 4,066,796 | 1/1978 | McKee | 426/302 |
| 4,293,572 | 10/1981 | Silva et al. | 426/19 |
| 4,520,034 | 5/1985 | Ishii et al. | 426/96 |

FOREIGN PATENT DOCUMENTS

| | | | |
|---|---|---|---|
| 306000 | 3/1989 | European Pat. Off. | 426/94 |
| WO8600501 | 1/1986 | PCT Int'l Appl. | |
| 2097646 | 1/1966 | United Kingdom | |

OTHER PUBLICATIONS

Kamper et al, Water Vapor Permeability of Edible Bilayer Films, 1984 Journal of Food Science vol. 49 pp. 1478-1481 and 1485.

Hullinger, Starch Film and Coating 1965 vol. 10, No. 9 Cereal Science Today, pp. 508 and 510.

*Primary Examiner*—Arthur L. Corbin
*Attorney, Agent, or Firm*—Vogt & O'Donnell

[57] ABSTRACT

This invention relates to a multi-component food product in which the individual components differ from one another in their water activity and which comprises a protective barrier against the transfer of moisture between the components, this barrier being formed by a mixture of egg, milk protein, pregelatinized starch and water.

6 Claims, No Drawings

PROCESS FOR PREPARING A MULTI-COMPONENT FOOD PRODUCT INCLUDING A PROTECTIVE BARRIER

BACKGROUND OF THE INVENTION

This invention relates to a multi-component food product in which the individual components differ from one another in their water activity and which comprises a protective barrier against the transfer of moisture between the components.

The invention also relates to a process for producing this product and to the composition for carrying out the process.

The problem of spoilage in food products by the transfer of moisture between components of different water activity is well known. The migration of water from one of two components to the other takes place from the moment when different moisture partial pressure gradients exist between the two components. Solutions to this problem have already been proposed.

Patent application WO 86/00501 relates to an edible film with a moisture barrier based on the combination of a layer of a hydrophilic polymer, such as albumin, with a layer of a lipid adhering to that layer. This patent mentions a preformed film which is applied to a substrate to form a barrier. This solution may be considered for use in the case of fresh products. However, it is not satisfactory for products which have to be cooked or reheated because the lipids present melt during reheating and thus disrupt the barrier effect.

SUMMARY OF THE INVENTION

The object of the present invention is to provide a multi-component food product in which the individual components differ from one another in their moisture content and which comprises a barrier against the transfer of moisture between the components, this barrier guaranteeing impermeability over a temperature range from the freezing temperature to the cooking temperature.

The present invention relates to a food product and a process for preparing that product in which the protective barrier is formed by a mixture of egg, milk protein and water. To ensure that a layer formed by these ingredients acts as a barrier, it has to be subjected, after application to the less moist component, to a heat treatment so that the egg coagulates. It is from this moment that the barrier layer (or film) becomes hydrophobic and impermeable. After thermal activation, the second component may be deposited on the protective barrier.

DETAILED DESCRIPTION OF THE INVENTIONS

In the context of the invention, a food product is understood to be both a product intended for freezing and a fresh product. Frozen products are understood to include, in particular, pizzas and cakes intended for cooking or reheating while fresh products are understood to include, in particular, multi-layer cakes or desserts with fillings. The less moist component is understood to be a dough, a bread, or a fresh cake, both cooked or precooked and fresh. The more moist component is understood to include both savory fillings made from vegetables, ham, meats, cheeses, tomato sauce and also sweet fillings made from various fruits.

In the context of the invention, egg is understood to be both egg yolk, egg white or whole egg. The egg may be both fresh egg, frozen egg or egg powder. The quantities indicated below are based on dry weight.

The milk protein is preferably casein or one of its salts, such as calcium, potassium or sodium caseinate. It is preferred to use calcium caseinate. The starch used is pre-gelatinized starch because it dissolves well and gives a gel at ambient temperature.

The present invention also relates to a process for producing the above-mentioned food product in which the mixture for the protective barrier described above is placed on the less moist component and heat-treated and the second component is placed on the protective barrier thus formed.

The fact that egg is used is interesting because it is soluble in water, has film-forming qualities and bonding properties, coagulates on heating and is hydrophobic in character when coagulated. The fact that egg is used in combination with a milk protein increases the viscosity of the film-forming solution while improving its distribution and considerably strengthens the structure of the film. The interaction of the ingredients during thermal coagulation is responsible for the particular functional properties of this barrier.

It has advantageously been found that the addition of pregelatinized starch to the barrier composition enables the film to be provided with good bonding and adhesion properties.

Since the barrier functions over a wide temperature range, any composite food product in which it is desired to avoid the migration of water from one component to the other may of course be envisaged. The less moist component is afforded protection both during production of the food product at ambient temperature and during storage in a freezer and during reconstitution of the product by heating.

The protective barrier preferably contains from 3 to 12% egg, from 3 to 18% of a milk protein and from 7 to 12% pregelatinized starch, the balance to 100% being water. The contents of the respective components of the mixture should not fall below the lower limits indicated because otherwise the film would be less impermeable with a less resistant texture. Neither should the respective contents exceed the upper limits indicated because otherwise the film would be too thick and too hard and would thus be noticed by the consumer. The optimal composition of the mixture is adapted to each product in dependence upon the hardness, texture and appearance of the less moist component. It is oriented towards easy and rapid application, the highest impermeability and a resistant texture being suitable for the support.

It is also possible to add to the composition of the barrier any other ingredient suitable for use in food technology, such as colourings and flavourings and even lipids if the food product in question is not for reheating.

The composition of the barrier is placed on the flat surface of the less moist component in a quantity of 5 to 5 g/100 cm$^2$ substrate.

The following procedure is adopted. A suspension is prepared from egg, a milk protein and, optionally, the pregelatinized starch and water in the desired concentration. A thin layer of this suspension is applied in the desired concentration, for example to bread dough in the case of a pizza. The suspension may be applied by any known means, i.e., manually (brush or spatula), by spraying or by coating. The heat treatment is then carried out for 15 seconds to 2 minutes at a temperature in the range from 70° to 100° C. This heat treatment is critical to the development of the hydrophobic and impermeable character. In view of the water content of the mixture of proteins and the short heating time, the temperature hardly reaches 100° C. It is imperative that the heat treatment be terminated before any browning of the surface appears.

One feature of the invention is the formation of the impermeable layer in situ on the surface to be protected. The layer of proteins only acquires its solid structure after the heat treatment. This is a major advantage over preformed films, for example of the type described in the above-cited patent application WO 86/00501. The process according to the invention is flexible so that the barrier adapts itself to the multiple shapes and surfaces of the supports without any need for a special method of application. The adhesion of the film formed to the support is excellent.

Any type of heating may be used to activate the barrier, for example oven heating, infrared heating or microwave heating. On an industrial scale, an infrared emitter may be arranged over a conveyor belt transporting the less moist component with the non-activated barrier on its surface. This surface is thus exposed to the heat source. In this system, the heating time of the surface layer may be regulated in accordance with the rate of advance of the conveyor belt and the intensity of heating, taking into account the capacity of the emitter and its distance from the surface to be treated.

After the heat treatment, the second more moist component may be placed on the food product with its activated barrier. The composite product is thus ready either for packing and freezing or for packing in the case of a refrigerated product.

A very frequent problem with products of this type is that, during the reheating (after freezing) or cooking of a pizza in an oven, a large amount of fluid enters the bread (in the case of a pizza with filling) if the pizza has no protective barrier. On the other hand, it has been found that the penetration of water is less and the organoleptic quality distinctly higher if the barrier described above is applied. It is interesting to note that the impermeability of the barrier layer has been observed at ambient temperature, in the frozen state and during cooking at elevated temperature.

The invention also relates to the composition for carrying out the process described above. This composition contains from 25 to 75% egg powder and from 25 to 75% by weight of milk protein powder. For use, it is sufficient to dissolve this powder mixture in water in the desired concentration and to apply it to the least moist substrate.

The composition advantageously contains from 25 to 35% egg powder, from 25 to 35% milk protein powder and from 30 to 50% pregelatinized starch. Besides the advantages mentioned above, the addition of starch enables the cost of the composition to be reduced.

The aqueous solution of this mixture is applied to the least moist component and then solidified by heat treatment. It thus forms an insoluble and hydrophobic barrier between the components of a food product.

EXAMPLES

The invention is described in more detail in the following with reference to the Examples which relate to pizza with French bread (stick), i.e., consisting of one half bread on which various ingredients, such as ham, cheese, vegetables, tomato sauce, are placed. The mean moisture content of the bread is 30% while the moisture content of the filling is between 35 and 80%. An industrially produced pizza such as this is normally intended for freezing.

EXAMPLE 1

A suspension is prepared from 10 g dry egg white, 15 g calcium caseinate and 75 g water. The mixture was spread over the cut surface of the bread in a quantity of 7 g suspension to 100 cm$^2$ and the barrier layer was heated in less than 60 seconds by an infrared emitter arranged above. The bread was removed before the layer turned brown. Tested with water, the hydrophobic character of the surface and its impermeability to water were observed for 8 hours.

In a second test, the bread comprising a protective layer was covered with tomato sauce. The pizza was stored in a freezer and then cooked in an oven for 20 minutes at 180° C., as indicated for commercial products. No penetration of liquid into the bread was found. The structure of the bread and the texture of the crumb had remained intact. A heat-resistant barrier is thus present. By contrast, in the absence of the barrier layer, the water in the tomato sauce (water content approximately 80%) penetrated the bread and diminished its organoleptic qualities.

The barrier layer integrates well with the product and the consumer is certainly not aware of its presence.

EXAMPLE 2

The same type of bread as in Example 1 was used. A suspension in water of 10% pregelatinized starch, 5% calcium caseinate and 5% egg white powder was applied to the bread which was then subjected to the same heat treatment and covered with ketchup. The whole was left in a freezer for at least 24 hours. After storage, the pizza was reheated for 20 minutes at 180° C. in a conventional oven.

Effective protection is observed; the bread is not soaked with water; a layer of 7 g per 100 cm$^2$ is sufficient; and a layer of 10 g is too thick and too hard.

A good film with a good appearance is present, its surface being smooth and its texture elastic and soft.

EXAMPLE 3

A bread with a surface layer is prepared by the method described in Example 1. Various ingredients used in the production of pizzas (such as ham, cheese, vegetables, tomato sauce) are placed on the protected surface of the bread. The pizza is then packed and stored in a freezer at −20° C. An equivalent number of pizzas of this type were made without the protective layer on the bread. The pizzas were heated in an oven for 25 minutes at 180° C. for tasting after storage for 1 month, 2 months and 8 months.

The examiners found the pizza with a protective layer between the bread and the filling to be of distinctly higher organoleptic quality. In the pizza with no protective layer between the bread and the filling, the bread was moist and soft. The protective layer was not noticed by the examiners because its colour and texture integrate well with the support. No spoilage or loss of impermeability was observed after the prolonged storage.

EXAMPLE 4

A precooked and frozen round pizza base was covered over its upper surface with a protective layer a) as described in Example 1 and b) as described in Example 2. After activation of the impermeable barrier by the same heat treatment, the filling (tomatoes, mozzarella and spices) was placed on the base. The pizza was then vacuum-packed in a bag and stored in a freezer at $-25°$ C. An equivalent number of pizzas without a protective covering were made to serve as controls during tasting. The pizzas were removed monthly from the freezer and reheated for organoleptic evaluation. The same observations as described in Example 3 were made.

Accordingly, the present invention seeks to solve an acute problem by attracting the consumer to a composite product in which each component has no effect on the other in regard to its integrity. The quality of multi-component food products is thus improved by means of a heat-activated protective barrier.

We claim:

1. A process for preparing a multi-component food product having a hydrophobic barrier between food components having differing moisture contents comprising:

preparing a suspension mixture comprised of from 3% to 12% egg and from 3% to 18% milk protein by weight and water;

applying a coating layer of the mixture to a first component of a food product;

heating the coated food component for from 15 seconds to 2 minutes at a temperature of from 70° C. to 100° C. so that the egg coagulates; and depositing a second food component on the coated layer of the treated food component.

2. A process according to claim 1 wherein the second food component is more moist than the first food component.

3. A process according to claim 1 wherein the mixture further comprises from 7% to 12% pregelatinized starch by weight.

4. A process according to claim 1 or 3 wherein in the mixture is applied to a surface of the food product in an amount from 5 g/100 cm$^2$ surface to 15 g/100 cm$^2$ surface.

5. A process according to claim 1 wherein the egg is selected from the group consisting of whole egg, egg yolk and egg white and the milk protein is selected from the group consisting of casein, potassium caseinate, sodium caseinate and calcium caseinate.

6. A process according to claim 1 wherein an infrared emitter heats the coated food component.

* * * * *